(12) United States Patent
Krause et al.

(10) Patent No.: US 9,416,215 B2
(45) Date of Patent: *Aug. 16, 2016

(54) CATALYSTS AND USE THEREOF IN THE PRODUCTION OF POLYURETHANES

(75) Inventors: Jens Krause, Mours Saint Eusebe (FR);
Stephan Reiter, Köln (DE); Stefan Lindner, Köln (DE); Axel Schmidt, Singapore (SG); Klaus Jurkschat, Dortmund (DE); Markus Schürmann, Recklinghausen (DE); Gerrit Bradtmöller, Dorsten (DE)

(73) Assignee: Covestro Deutschland AG, Leverkusen (DE)

( * ) Notice: Subject to any disclaimer, the term of this patent is extended or adjusted under 35 U.S.C. 154(b) by 116 days.

This patent is subject to a terminal disclaimer.

(21) Appl. No.: 12/990,664

(22) PCT Filed: Apr. 18, 2009

(86) PCT No.: PCT/EP2009/002849
§ 371 (c)(1),
(2), (4) Date: Nov. 2, 2010

(87) PCT Pub. No.: WO2009/132784
PCT Pub. Date: Nov. 5, 2009

(65) Prior Publication Data
US 2011/0054140 A1 Mar. 3, 2011

(30) Foreign Application Priority Data
May 2, 2008 (DE) .......... 10 2008 021 980

(51) Int. Cl.
| *C08G 18/24* | (2006.01) |
| *B01J 31/02* | (2006.01) |
| *C08G 18/10* | (2006.01) |
| *C08G 18/79* | (2006.01) |

(52) U.S. Cl.
CPC ............ *C08G 18/24* (2013.01); *B01J 31/0211* (2013.01); *B01J 31/0228* (2013.01); *B01J 31/0237* (2013.01); *B01J 31/0241* (2013.01); *C08G 18/10* (2013.01); *C08G 18/792* (2013.01); *B01J 2231/341* (2013.01); *B01J 2531/42* (2013.01); *Y02P 20/52* (2015.11)

(58) Field of Classification Search
CPC .. C08G 18/24; B01J 31/0211; B01J 31/0228; B01J 31/0237; B01J 31/0241
USPC ............ 502/167, 168, 171; 521/126; 528/58; 556/85, 88, 89, 90, 93, 94, 105, 107
See application file for complete search history.

(56) References Cited

U.S. PATENT DOCUMENTS

| 3,164,557 A | 1/1965 | Merten at al. |
| 3,714,077 A | 1/1973 | Cobbledick et al. |
| 4,430,456 A | 2/1984 | Bechara et al. |
| 4,584,362 A | 4/1986 | Leckart et al. |
| 5,011,902 A | 4/1991 | Foucht |
| 5,902,835 A | 5/1999 | Meier et al. |
| 6,590,057 B1 | 7/2003 | Brecht et al. |
| 8,946,372 B2 * | 2/2015 | Richter et al. .................. 528/53 |
| 9,079,924 B2 * | 7/2015 | Lehmann ................ C07F 7/003 |

FOREIGN PATENT DOCUMENTS

| DE | 1111377 B | 7/1961 |
| DE | 242617 A1 | 2/1987 |
| DE | 102004011348 A1 | 9/2005 |
| EP | 0890576 A2 | 1/1999 |
| GB | 899948 A | 6/1962 |
| WO | WO-2005/058996 A1 | 6/2005 |
| WO | WO 2008/155569 A1 * | 12/2008 |

* cited by examiner

*Primary Examiner* — Rabon Sergent
(74) *Attorney, Agent, or Firm* — Drinker Biddle & Reath LLP

(57) ABSTRACT

The present invention relates to new catalysts and production thereof as well as the preferred use thereof in the production of polyisocyanate polyaddition products. The described catalysts are tetravalent tin compounds with at least one ligand bonded via at least one oxygen atom or sulfur atom and containing at least one nitrogen atom.

6 Claims, No Drawings

CATALYSTS AND USE THEREOF IN THE PRODUCTION OF POLYURETHANES

CROSS-REFERENCE TO RELATED APPLICATIONS

This application is a national stage application (under 35 U.S.C. §371) of PCT/EP2009/002849, filed Apr. 18, 2009, which claims benefit of German application 10 2008 021 980.0 filed May 2, 2008.

BACKGROUND OF THE INVENTION

The invention relates to novel catalysts and to the preparation thereof and also to the preferred use thereof in the production of polyisocyanate polyaddition products.

Polyurethanes have long been known and are employed in many fields. Frequently the actual polyurethane reaction has to be carried out using catalysts, since otherwise the reaction proceeds too slowly and, in appropriate circumstances, results in polyurethane products with poor mechanical properties. In most cases, the reaction between the hydroxyl component and the NCO component has to be catalysed. In the case of the customary catalysts, a distinction is made between metalliferous and non-metalliferous catalysts. Typical customary catalysts are, for example, amine catalysts such as, for instance, 1,8-diazabicyclo[5.4.0]undec-7-ene (DBU), 1,4-diazabicyclo[2.2.2]octane (DABCO) or triethanolamine. In the case of metalliferous catalysts, it is usually a question of Lewis-acid compounds, such as, for instance, dibutyltin dilaurate, lead octoate, tin octoate, titanium and zirconium complexes, but also cadmium compounds, bismuth compounds (for example, bismuth neodecanoate) and iron compounds. One requirement placed upon the catalyst is that it catalyses, in as defined a manner as possible, only one of the diverse polyurethane reactions, such as, for instance, only the reaction between OH groups and NCO groups. Side reactions—such as, for example, dimerisations or trimerisations of the isocyanate, allophanatisations, biuretisations, water reactions or formations of urea—should not be catalysed in the course of this one reaction. The requirement is always to the effect that an optimal catalyst catalyses precisely the reaction that is desired—for example, only the water reaction—so that a defined foam profile arises or, as in the case where use is made of the potassium acetates, preferably the polyisocyanurate reaction. Hitherto, however, there have hardly been any catalysts that catalyse only one defined reaction. But this is extremely desirable precisely in the case of the diverse reaction possibilities in the preparation of polyurethane. Of particular interest are not only catalysts that catalyse only one reaction in defined manner but catalysts that additionally become selectively active and catalyse reactions only under certain conditions. In such cases, one speaks of switchable catalysts. These switchable catalysts are, in turn, subdivided into thermally, photochemically or optically switchable catalysts. Generally in this connection one also speaks of latent catalysts, and, in the thermal case, of thermolatent catalysts. These catalysts are idle until the reaction mixture reaches a certain temperature. Above this temperature they are then active, preferably instantaneously active. These latent catalysts enable long pot lives and fast demoulding-times.

The class of latent catalysts that has been known hitherto and used where appropriate consists of mercury compounds. The most prominent representative of these is phenylmercury neodecanoate (Thorcat 535 and Cocure 44). This catalyst reveals a latent reaction profile, the catalyst being virtually inactive initially and becoming instantaneously active at a certain temperature (usually around 70° C.) only after slow heating of the mixture, usually by reason of the exothermic nature of the uncatalysed conversion of NCO groups with OH groups. When this catalyst is employed, very long open-times with very short curing-times can be achieved. This is particularly advantageous when a great deal of material has to be discharged (for example, a large mould has to be filled) and the reaction is to be terminated rapidly and hence economically after discharge has taken place.

When latent catalysts are used, it is particularly advantageous if, in addition, the following conditions are satisfied:
a) An increase in the catalyst quantity accelerates the reaction without the catalyst losing latency.
b) A lowering of the catalyst quantity slows down the reaction without the catalyst losing latency.
c) A variation of the catalyst quantity, of the index, of the mixing ratio, of the output quantity and/or of the proportion of hard segment in the polyurethane does not impair the latency of the catalyst.
d) In all the aforementioned variations, the catalyst provides for a virtually complete conversion of the reactants without tacky places being left behind.

A particular advantage of the latent catalysts can be seen in the fact that, as a consequence of their diminishing catalytic action with falling temperature, they accelerate the dissociation of urethane groups in the finished polyurethane material, at room temperature for example, only a little in comparison with conventional catalysts. Consequently they contribute to favourable continuous-use properties of the polyurethanes.

Furthermore, when catalysts are employed care generally has to be taken to ensure that the physical properties of the products are, as far as possible, not influenced negatively. This is also the reason why a targeted catalysis of a certain reaction is so important. Precisely in the preparation of elastomers, particularly of casting elastomers, the use of mercury catalysts is very widespread, since they are widely employable, do not have to be combined with additional catalysts, and catalyse the reaction between OH groups and NCO groups very selectively. The only—though very significant—drawback is the high toxicity of the mercury compounds, so great efforts are being made to find alternatives to the mercury catalysts. Furthermore, these compounds are prohibited in some industries (automobile industry, electrical industry).

A survey of the state of the art is given in WO 2005/058996. Here it is described how working proceeds with titanium and zirconium catalysts. Numerous possible combinations of various catalysts are also mentioned.

Although systems that are at least less toxic than mercury catalysts—for example, based on tin, zinc, bismuth, titanium or zirconium, but also amidine and amine catalysts—are known on the market, they have not hitherto exhibited the robustness and simplicity of the mercury compounds.

Certain combinations of catalysts cause the gel reaction to take place very largely separately from the curing reaction, since many of these catalysts act only selectively. By way of example, bismuth(III) neodecanoate is combined with zinc neodecanoate and neodecanoic acid. Often 1,8-diazabicyclo [5.4.0]undec-7-ene is additionally added. Although this combination pertains to the most well-known, it is unfortunately not so widely and universally employable as, for example, Thorcat 535 (Thor Especialidades S.A.) and is furthermore susceptible in the event of fluctuations in the formulation. The use of these catalysts is described in DE 10 2004 011 348. Further combinations of catalysts are disclosed in WO 2005/058996, U.S. Pat. Nos. 3,714,077, 4,584,362, 5,011,902, 5,902,835 and 6,590,057.

In the case of the product DABCO DC-2, produced by Air Products Chemicals Europe B.V., which is available on the market, it is a question of a catalyst mixture consisting of 1,4-diazabicyclo[2.2.2]octane (DABCO) and dibutyltin diacetate. The disadvantage of this mixture is that the amine acts in activating manner immediately. Alternative systems are, for example, POLYCAT SA-1/10 (Air Products Chemicals Europe B.V.). In this case, it is a question of DABCO that is blocked with acid. Although this system is thermolatent, systems of such a type are not used, on account of their poor catalytic action in the course of curing; the elastomers that are produced in the presence of these systems remain tacky at the end of the reaction; one also speaks of the 'starving' of the reaction.

The object was therefore to make available systems and catalysts with which it is possible to prepare polyisocyanate polyaddition products having good mechanical properties and which initially provide a greatly delayed reaction and, after this initial phase, an accelerated reaction to yield the end product. The system and the catalyst should, in addition, be free from toxic heavy metals such as cadmium, mercury and lead.

This object was surprisingly able to be achieved through the use of special Sn(IV) catalysts.

DESCRIPTION OF THE INVENTION

The invention provides polyisocyanate polyaddition products with good mechanical properties, obtainable from
a) polyisocyanates and
b) NCO-reactive compounds
in the presence of
c) latent catalysts
d) optionally, further catalysts and/or activators different from c)
with addition of
e) optionally, blowing agents
f) optionally, fillers and/or fibrous materials
g) optionally, auxiliary substances and/or additives,
characterised in that by way of latent catalysts tetravalent mononuclear tin compounds of the formula I with at least one ligand bonded via at least one oxygen atom or sulfur-atom and containing at least one nitrogen atom $$\text{Sn(IV)}(L^1)_{n1}(L^2)_{n2}(L^3)_{n3}(L^4)_{n4} \quad (I)$$

with n1, n2, n3, n4 0 or 1 and $L^1$, $L^2$, $L^3$, $L^4$ univalent, divalent, trivalent or tetravalent ligands
or tetravalent polynuclear tin compounds based thereon are employed, wherein at least one ligand per Sn atom has the following significance:

—X—Y with X=O, S, OC(O), OC(S), O(O)S(O)O, O(O)S(O)
Y=—R1-N(R2)(R3) or —R1-C(R4)=NR2
R1, R2, R3, R4 independently of one another are saturated or unsaturated, cyclic or acyclic, branched or unbranched, substituted or unsubstituted hydrocarbon residues optionally interrupted by heteroatoms, or R2, R3, R4 independently of one another are hydrogen, R1-X, or R2 and R3 or R2 and R1 or R3 and R1 or R4 and R1 or R4 and R2 form a ring
and wherein the remaining ligands independently of one another are —X—Y with the aforementioned significance or have the following significance:
saturated or unsaturated, cyclic or acyclic, branched or unbranched, substituted or unsubstituted hydrocarbon residues optionally interrupted by heteroatoms, halides, hydroxide, amide residues, oxygen, sulfur, R2 or XR2, particularly preferably oxygen, sulfur, alcoholates, thiolates or carboxylates.

The invention further provides a process for preparing the polyisocyanate polyaddition products according to the invention, wherein
polyisocyanates (a) are converted with NCO-reactive compounds (b) in the presence of latent catalysts (c) and, optionally, additional catalysts and/or activators different from (c) with addition of, optionally, blowing agents, optionally fillers and/or fibrous materials and, optionally, auxiliary substances and/or additives, characterised in that by way of latent catalysts tetravalent mononuclear tin compounds of the formula I with at least one ligand bonded via at least one oxygen atom or sulfur atom and containing at least one nitrogen atom $$\text{Sn(IV)}(L^1)_{n1}(L^2)_{n2}(L^3)_{n3}(L^4)_{n4} \quad (I)$$

with n1, n2, n3, n4 0 or 1 and $L^1$, $L^2$, $L^3$, $L^4$ univalent, divalent, trivalent or tetravalent ligands
or tetravalent polynuclear tin compounds based thereon are employed, wherein at least one ligand per Sn atom has the following significance:

—X—Y with X=O, S, OC(O), OC(S), O(O)S(O)O, O(O)S(O)
Y=—R1-N(R2)(R3) or —R1-C(R4)=NR2
R1, R2, R3, R4 independently of one another are saturated or unsaturated, cyclic or acyclic, branched or unbranched, substituted or unsubstituted hydrocarbon residues optionally interrupted by heteroatoms, or R2, R3, R4 independently of one another are hydrogen, R1-X, or R2 and R3 or R2 and R1 or R3 and R1 or R4 and R1 or R4 and R2 form a ring
and wherein the remaining ligands independently of one another are —X—Y with the aforementioned significance or have the following significance:
saturated or unsaturated, cyclic or acyclic, branched or unbranched, substituted or unsubstituted hydrocarbon residues optionally interrupted by heteroatoms, halides, hydroxide, amide residues, oxygen, sulfur, R2 or XR2, particularly preferably oxygen, sulfur, alcoholates, thiolates or carboxylates.

The invention further provides dinuclear tetravalent tin compounds of the formula II with at least one ligand per Sn atom bonded via at least one oxygen atom or sulfur atom and containing at least one nitrogen atom $$[(L^1)_{n1}(L^2)_{n2}(L^3)_{n3}\text{Sn(IV)}]_2\text{O} \quad (II)$$

with n1, n2 0 or 1 and $L^1$, $L^2$, $L^3$ univalent, divalent or trivalent ligands, wherein at least one ligand per Sn atom has the following significance:

—X—Y with X=O, S, OC(O), OC(S), O(O)S(O)O, O(O)S(O)
Y=—R1-N(R2)(R3) or —R1-C(R4)=NR2
R1, R2, R3, R4 independently of one another are saturated or unsaturated, cyclic or acyclic, branched or unbranched, substituted or unsubstituted hydrocarbon residues optionally interrupted by heteroatoms, or R2, R3, R4 independently of one another are hydrogen, R1-X, or R2 and R3 or R2 and R1 or R3 and R1 or R4 and R1 or R4 and R2 form a ring
and wherein the remaining ligands are —X—Y with the aforementioned significance or have the following significance saturated or unsaturated, cyclic or acyclic, branched or unbranched, substituted or unsubstituted hydrocarbon residues optionally interrupted by heteroatoms, halides, hydroxide, amide residues, oxygen, sulfur, R2 or XR2, particularly preferably oxygen, sulfur, alcoholates, thiolates or carboxylates.

The invention further provides a process for preparing the dinuclear tetravalent tin compounds of the formula II according to the invention with at least one ligand per Sn atom bonded via at least one oxygen atom or sulfur atom and containing at least one nitrogen atom, characterised in that they are prepared from corresponding mononuclear or polynuclear Sn(IV) compounds via a ligand exchange.

The invention further provides dinuclear or polynuclear tetravalent tin compounds of the formula III with at least one ligand per Sn atom bonded via at least one oxygen atom or sulfur atom and containing at least one nitrogen atom $$[(L^1)_{n1}(L^2)_{n2}Sn(IV)O]_n \quad (III)$$

with n1, n2 0 or 1, n greater than or equal to 2 and $L^1$, $L^2$ univalent or divalent ligands,
wherein at least one ligand per Sn atom has the following significance:

—X—Y with X=O, S, OC(O), OC(S), O(O)S(O)O, O(O)S(O)
Y=—R1-N(R2)(R3) or —R1-C(R4)=NR2
R1, R2, R3, R4 independently of one another are saturated or unsaturated, cyclic or acyclic, branched or unbranched, substituted or unsubstituted hydrocarbon residues optionally interrupted by heteroatoms, or R2, R3, R4 independently of one another are hydrogen, R1-X, or R2 and R3 or R2 and R1 or R3 and R1 or R4 and R1 or R4 and R2 form a ring
and wherein the remaining ligand is —X—Y with the aforementioned significance or has the following significance:
saturated or unsaturated, cyclic or acyclic, branched or unbranched, substituted or unsubstituted hydrocarbon residue optionally interrupted by heteroatoms, halide, hydroxide, amide residue, oxygen, sulfur, R2 or XR2, particularly preferably oxygen, sulfur, alcoholates, thiolates or carboxylates.

The invention further provides a process for preparing the dinuclear or polynuclear tetravalent tin compounds of the formula III according to the invention with at least one ligand per Sn atom bonded via at least one oxygen atom or sulfur atom and containing at least one nitrogen atom, characterised in that they are prepared from corresponding mononuclear or polynuclear tin(II) compounds by oxidation with simultaneous oligomerisation or from corresponding mononuclear or polynuclear Sn(IV) compounds via a ligand exchange. Oxidation is preferably effected with oxygen/air or with peroxo compounds.

The invention further provides latent catalysts consisting of tetravalent mononuclear tin compounds of the formula I with at least one ligand bonded via at least one oxygen atom or sulfur atom and containing at least one nitrogen atom, or of dinuclear or polynuclear tetravalent tin compounds of the formulae II, III or IV with at least one ligand per Sn atom bonded via at least one oxygen atom or sulfur atom and containing at least one nitrogen atom $$Sn(IV)(L^1)_{n1}(L^2)_{n2}(L^3)_{n3}(L^4)_{n4} \quad (I)$$

with n1, n2, n3, n4 0 or 1 and $L^1$, $L^2$, $L^3$, $L^4$ univalent, divalent, trivalent or tetravalent ligands $$[(L^1)_{n1}(L^2)_{n2}(L^3)_{n3}Sn(IV)]_2O \quad (II)$$

with n1, n2 0 or 1 and $L^1$, $L^2$, $L^3$ univalent, divalent or trivalent ligands $$[(L^1)_{n1}(L^2)_{n2}Sn(IV)O]_n \quad (III)$$

$$[(L^1)_{n1}(L^2)_{n2}Sn(IV)S]_n \quad (IV)$$

with n1, n2 0 or 1, n greater than or equal to 2 and $L^1$, $L^2$ univalent or divalent ligands,
wherein at least one ligand per Sn atom has the following significance:

—X—Y with X=O, S, OC(O), OC(S), O(O)S(O)O, O(O)S(O)
Y=—R1-N(R2)(R3) or —R1-C(R4)=NR2
R1, R2, R3, R4 independently of one another are saturated or unsaturated, cyclic or acyclic, branched or unbranched, substituted or unsubstituted hydrocarbon residues optionally interrupted by heteroatoms, or R2, R3, R4 independently of one another are hydrogen, R1-X, or R2 and R3 or R2 and R1 or R3 and R1 or R4 and R1 or R4 and R2 form a ring
and wherein the remaining ligands independently of one another are —X—Y with the aforementioned significance or have the following significance:
saturated or unsaturated, cyclic or acyclic, branched or unbranched, substituted or unsubstituted hydrocarbon residues optionally interrupted by heteroatoms, halides, hydroxide, amide residues, oxygen, sulfur, R2 or XR2, particularly preferably oxygen, sulfur, alcoholates, thiolates or carboxylates.

Processes for preparing the compounds of the formula I and of the formula IV can be found, inter alia, in: A. A. Selina, S. S. Karlov, E. Kh. Lermontova, G. S. Zaitseva, *Chem. Heterocycl. Comp.* 2007, 43, 813, R. C. Mehrotra, V. D. Gupta, *Indian J Chem.* 1967, 5, 643, and in literature cited therein.

The latent catalysts consisting of the aforementioned tin (IV) compounds are preferentially employed in the preparation of polyisocyanate polyaddition compounds, in particular polyurethanes.

In the case of the ligands differing from the special ligand, it is a question of the ligands known from tin chemistry. These ligands may, independently of one another, be bonded to the tin partially or exclusively via carbon (organic tin compounds or tin organyls). The hydrocarbon residues bonded directly to the tin are preferably saturated alkyl residues with 1 to 30 carbon atoms, particularly preferably with 1 to 8 carbon atoms. The ligands may, independently of one another, also be bonded to the tin exclusively via non-carbon atoms (inorganic tin compounds). The inorganic tin compounds—that is to say, tin compounds without tin-carbon bonds—are preferred by reason of their lower toxicity.

In the case of the ligands differing from the special ligand, it is preferably a question of oxygen bridges, hydroxide, alcoholates, carboxylates, thiolates (in each instance preferably with 1 to 30 carbon atoms, particularly preferably with 1 to 12 carbon atoms) and halides (preferably chloride and bromide); in particularly preferred manner the bonding of the ligands to the tin is effected via oxygen, for example as an oxygen bridge, as hydroxide or in the form of an alkoxy group (alcoholate) or as carboxylate.

Preferred alcoholate ligands are MeO—, EtO—, PrO—, iPrO—, BuO—, tBuO—, PhO— and:

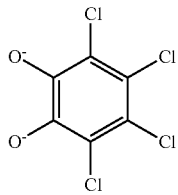 [SMILES: [O-]c1c([O-])c(Cl)c(Cl)c(Cl)c1Cl]

Me=methyl-, Et=ethyl-, Pr=propyl-, iPr=isopropyl-, Bu=n-butyl-, tBu=tert.-butyl-, Ph=phenyl residue Preferred carboxylate ligands are formate, acetate, propanoate, butanoate, pentanoate, hexanoate, ethyl hexanoate, laurate, lactate and benzoate; particularly preferred are ethyl hexanoate, laurate and benzoate.

As is generally known, the tin compounds have a tendency towards oligomerisation, so that polynuclear tin compounds or mixtures of mononuclear and polynuclear tin compounds are frequently present. In the polynuclear tin compounds the tin atoms are preferably linked to one another via oxygen atoms.

Typical oligomeric complexes (polynuclear tin compounds) arise, for example, by condensation of the tin atoms via oxygen or sulfur, for example [OSn(O—R1-N(R2)-R1-O)]$_n$ with n>1. With low degrees of oligomerisation, cyclic oligomers are frequently found; with higher degrees of oligomerisation, linear oligomers with OH end groups are frequently found.

In the case of the special ligand —X—Y, X preferentially signifies oxygen, sulfur or —O—C(O)—.

In the case of the special ligands —X—Y, it is preferably a question of a ligand wherein X is oxygen, sulfur or —C(O)O—.

In the case of the ligand —X—Y, it is preferentially a question of a ligand wherein X is sulfur or oxygen and Y is —CH$_2$CH$_2$N(R)CH$_2$CH$_2$S or —CH$_2$CH$_2$N(R)CH$_2$CH$_2$O with R preferably Me, Et, Bu, tBu, Pr, iPr or Ph.

In the case of the ligand —X—Y, it is preferentially a question of a ligand wherein X is —O—C(O)— and Y is —CH$_2$—N(R)CH$_2$C(O)O with R preferably Me, Et, Bu, tBu, Pr, iPr or Ph.

Preferred as special ligand is also:

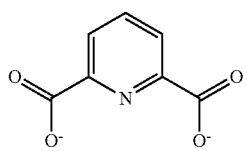 [SMILES: O=C([O-])c1cccc(C(=O)[O-])n1]

Preferred special ligands —X—Y are:

Me$_2$NCH$_2$CH$_2$O—, Et$_2$NCH$_2$CH$_2$O—, Me$_2$NCH$_2$CH(Me)O—, Bu$_2$NCH$_2$CH$_2$O—, Me$_2$NCH$_2$CH$_2$CH$_2$O—, PhN(H)CH$_2$CH$_2$O—, PhN(Et)CH$_2$CH$_2$O—, HN[CH$_2$CH$_2$O—]$_2$, —OCH$_2$CH$_2$N(H)CH$_2$CH$_2$CH$_2$O—, HN[CH$_2$CH(Me)O—]$_2$, MeN[CH$_2$CH$_2$O—]$_2$, BuN[CH$_2$CH$_2$O—]$_2$, PhN[CH$_2$CH$_2$O—]$_2$, MeN[CH$_2$CH(Me)O—]$_2$, BuN[CH$_2$CH(Me)O—]$_2$, PhN[CH$_2$CH(Me)O—]$_2$, N[CH$_2$CH$_2$O—]$_3$, N[CH$_2$CH(Me)O—]$_3$,

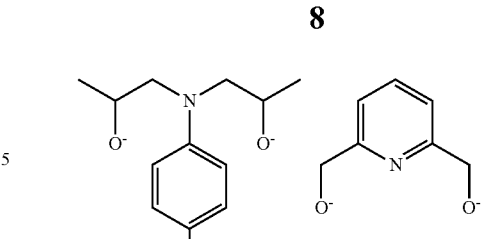

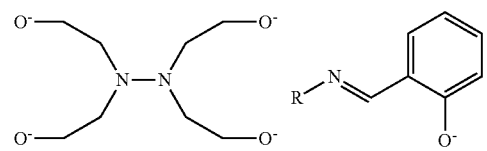

In a preferred variant, the tin compound consists of

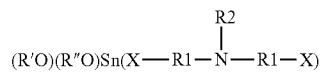

with X=O, S, OC(O), preferably O and OC(O), particularly preferably O, wherein the residues R' and R" may be the same or different. The two residues R1 may be different or the same and have the aforementioned significance. Residue R2 has the aforementioned significance. In a particularly preferred embodiment, the residues R' and R" are identical, as are also the two residues R1. In the case of the residues R' and R" and also R2, it is preferentially a question of alkyl residues. The residues R1 are preferably —(CH$_2$)$_n$—, wherein n is preferably 2. R2 and R' as well as R" are preferentially methyl, butyl, propyl or isopropyl. In place of the residues R'O and R"O there may also be oxygen atoms, in which case a dinuclear tin compound linked via two oxygen bridges is then obtained. This is a special case of the oligomeric tin(IV) compounds [OSn(O—R1-N(R2)-R1-O)]$_n$, with n>1 that have been described.

In the cases in which the tin compounds exhibit ligands with free OH residues, the catalyst may be incorporated into the product in the course of the polyisocyanate polyaddition reaction. An incorporation may also be effected via free NH groups or NH$_2$ groups of the ligands. A particular advantage of these incorporable catalysts is their greatly reduced fogging behaviour, this being important particularly in the case where polyurethanes are employed in the passenger compartment of automobiles.

The following formulae Ia to Ij illustrate some exemplary embodiments of the latent catalysts employed.

Formulae Ia to Ij:

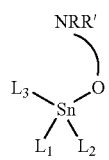

(a)

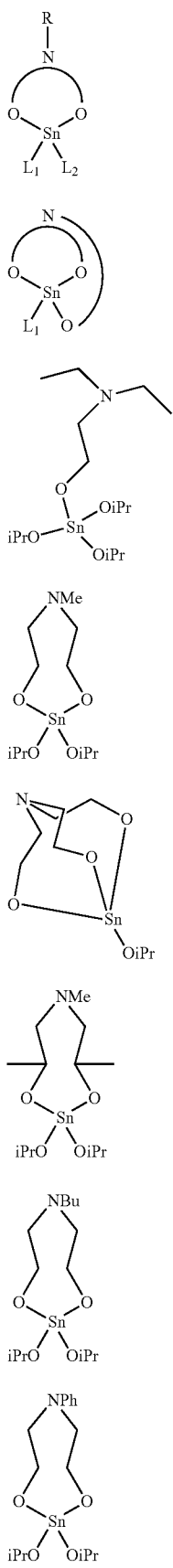

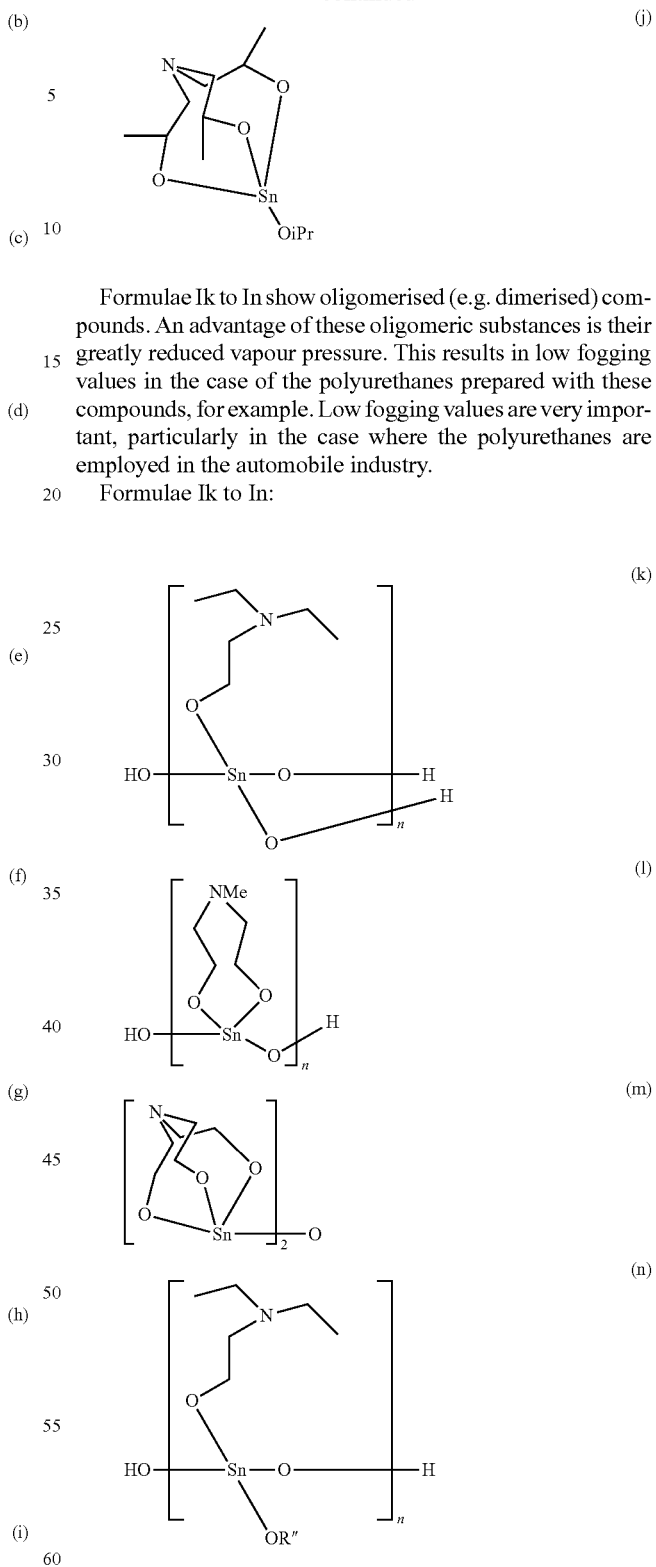

Formulae Ik to In show oligomerised (e.g. dimerised) compounds. An advantage of these oligomeric substances is their greatly reduced vapour pressure. This results in low fogging values in the case of the polyurethanes prepared with these compounds, for example. Low fogging values are very important, particularly in the case where the polyurethanes are employed in the automobile industry.

Formulae Ik to In:

In dissolved form the ligands on the tin are able to interchange amongst themselves or with the solvent (coordinating solvent) and to form further, alternative bridged or condensed structures with a higher or differing proportion of the tin nucleus, as is known from tin chemistry. In this case, it is a question of a dynamic equilibrium.

The latent catalysts can be combined with further catalysts/activators known from the state of the art; for example, titanium, zirconium, bismuth, tin(II) and/or ferriferous catalysts such as are described in WO 2005/058996, for example.

Also possible is an addition of amines or amidines. Furthermore, in the course of the polyisocyanate polyaddition reaction acidic compounds—such as, for example, 2-ethylhexanoic acid or alcohols—can also be added for the purpose of reaction control.

In a preferred variant the latent catalyst is added to the reaction mixture via the NCO-reactive compound or in a solvent. Also conceivable is a metered addition via the isocyanate component.

Examples of Preparation:

The various preparation methods for the tin(IV) compounds are described, inter alia, in: A. A. Selina, S. S. Karlov, E. Kh. Lermontova, G. S. Zaitseva, *Chem. Heterocycl. Comp.* 2007, 43, 813, R. C. Mehrotra, V. D. Gupta, *Indian J. Chem.* 1967, 5, 643, and in literature cited therein.

The tin(IV) compounds are obtainable by oxidation of the corresponding Sn(II) compounds.

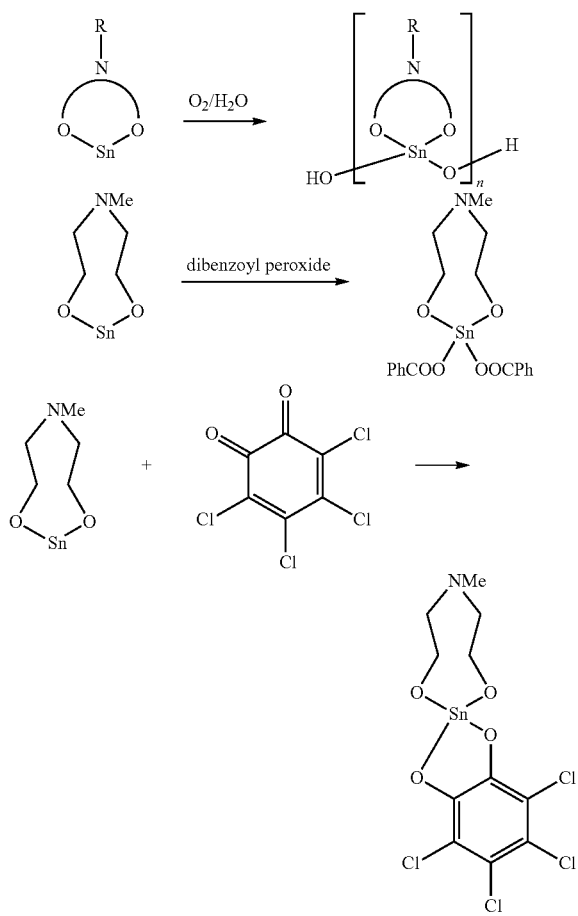

The tin(II) compounds may also be oxidised with halogens, preferably chlorine and bromine, to yield the corresponding dihalogentin(IV) compounds.

Furthermore, the tin(IV) compounds are obtainable via a ligand exchange. Sn(OR)$_4$ with R=alkyl or Sn(Hal)$_4$ with Hal=Cl, Br or I are, for example, converted with H—X—Y or M-X—Y (wherein X and Y have the aforementioned significance and M signifies sodium, lithium or potassium).

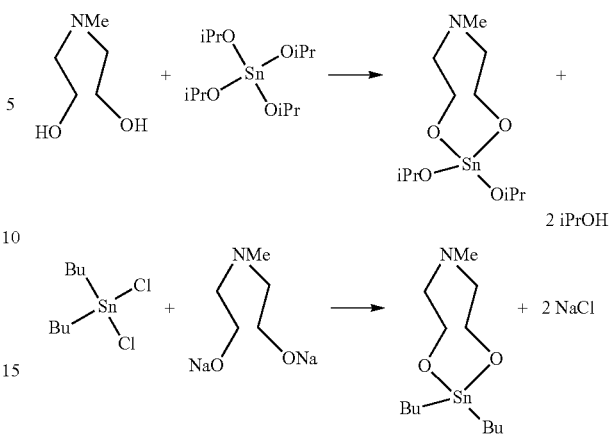

The suitable polyisocyanates (a) for the preparation of polyisocyanate polyaddition compounds, in particular polyurethanes, are the organic aliphatic, cycloaliphatic, aromatic or heterocyclic polyisocyanates with at least two isocyanate groups per molecule that are known as such to a person skilled in the art, and also mixtures thereof. Examples of suitable aliphatic and cycloaliphatic polyisocyanates are diisocyanates or triisocyanates, such as, for example, butane diisocyanate, pentane diisocyanate, hexane diisocyanate (hexamethylene diisocyanate, HDI), 4-isocyanatomethyl-1,8-octane diisocyanate (triisocyanatononane, TIN), and cyclic systems, such as, for example, 4,4'-methylene-bis(cyclohexyl isocyanate), 3,5,5-trimethyl-1-isocyanato-3-isocyanatomethylcyclohexane (isophorone diisocyanate, IPDI), and also ω,ω'-diisocyanato-1,3-dimethylcyclohexane (H$_6$XDI). By way of aromatic polyisocyanates, 1,5-naphthalene diisocyanate, diisocyanatodiphenylmethane (2,2'-, 2,4'- and 4,4'-MDI or mixtures thereof), diisocyanatomethylbenzene (2,4- and 2,6-toluylene diisocyanate, TDI) and technical mixtures of the two isomers as well as 1,3-bis(isocyanatomethyl)benzene (XDI) may, for example, be employed. Furthermore, TODI (3,3'-dimethyl-4,4'-biphenyl diisocyanate), PPDI (1,4-paraphenylene diisocyanate) and CHDI (cyclohexyl diisocyanate) can be used.

Besides these, however, the secondary products, known as such, of the aforementioned organic aliphatic, cycloaliphatic, aromatic or heterocyclic polyisocyanates with carbodiimide, uretoneimine, uretdione, allophanate, biuret and/or isocyanurate structure, as well as prepolymers that are obtained by conversion of the polyisocyanate with compounds with groups that are reactive towards isocyanate groups, can also be employed.

The polyisocyanate component (a) may be present in a suitable solvent. Suitable solvents are those which exhibit a sufficient solubility of the polyisocyanate component and are free from groups that are reactive towards isocyanates. Examples of such solvents are acetone, methyl ethyl ketone, cyclohexanone, methyl isobutyl ketone, methyl isoamyl ketone, diisobutyl ketone, ethyl acetate, n-butyl acetate, ethylene glycol diacetate, butyrolactone, diethyl carbonate, propylene carbonate, ethylene carbonate, N,N-dimethyl formamide, N,N-dimethyl acetamide, N-methyl pyrrolidone, N-ethyl pyrrolidone, methylal, ethylal, butylal, 1,3-dioxolan, glycerol formal, benzene, toluene, n-hexane, cyclohexane, solvent naphtha, 2-methoxypropyl acetate (MPA).

The isocyanate component may furthermore contain conventional auxiliary substances and additives, such as, for example, flow-improving agents (for example, ethylene carbonate, propylene carbonate, dibasic esters, citric acid esters), stabilisers (for example, Brønsted acids and Lewis acids, such as, for instance, hydrofluoric acid, phosphoric acid, benzoyl chloride, organomineral acids, such as dibutyl phosphate, moreover adipic acid, malic acid, succinic acid, racemic acid or citric acid), UV-screening agents (for example, 2,6-dibutyl-4-methylphenol), anti-hydrolysis agents (for example, sterically hindered carbodiimides), emulsifiers and also catalysts (for example, trialkyl amines, diazabicyclooctane, tin dioctoate, dibutyltin dilaurate, N-alkyl morpholine, lead octoate, zinc octoate, tin octoate, calcium octoate, magnesium octoate, the corresponding naphthenates and p-nitrophenolate and/or also mercuryphenyl neodecanoate) and fillers (for example, chalk), optionally dyestuffs that are incorporable into the polyurethane/polyurea to be formed later (which are accordingly provided with Tserevitinov-active hydrogen atoms) and/or coloured pigments.

By way of NCO-reactive compounds (b), all the compounds known to a person skilled in the art that exhibit an average OH functionality or NH functionality of at least 1.5 can be employed. These may be, for example, low-molecular diols (for example, 1,2-ethanediol, 1,3- and 1,2-propanediol, 1,4-butanediol), triols (for example, glycerin, trimethylolpropane) and tetraols (for example, pentaerythritol), short-chain polyamines, but also higher-molecular polyhydroxy compounds such as polyether polyols, polyester polyols, polycarbonate polyols, polysiloxane polyols, polyamines and polyether polyamines and also polybutadiene polyols.

Polyether polyols are available, in a manner known as such, by alkoxylation of suitable starter molecules subject to base catalysis or use of double-metal-cyanide compounds (DMC compounds). Suitable starter molecules for the preparation of polyether polyols are, for example, simple, low-molecular polyols, water, organic polyamines with at least two N—H bonds or arbitrary mixtures of starter molecules of such a type. Preferred starter molecules for the preparation of polyether polyols by alkoxylation, in particular in accordance with the DMC process, are, in particular, simple polyols, such as ethylene glycol, propylene glycol-1,3 and butanediol-1,4, hexanediol-1,6, neopentyl glycol, 2-ethylhexanediol-1,3, glycerin, trimethylolpropane, pentaerythritol, and also low-molecular esters, exhibiting hydroxyl groups, of polyols of such a type with dicarboxylic acids of the type stated below in exemplary manner, or low-molecular ethoxylation products or propoxylation products of simple polyols of such a type, or arbitrary mixtures of modified or unmodified alcohols of such a type. Alkylene oxides suitable for the alkoxylation are, in particular, ethylene oxide and/or propylene oxide, which can be employed in arbitrary sequence or even in a mixture in the course of the alkoxylation.

Polyester polyols can be prepared in known mariner by polycondensation of low-molecular polycarboxylic-acid derivatives, such as, for example, succinic acid, adipic acid, suberic acid, azelaic acid, sebacic acid, dodecanedioic acid, tetrahydrophthalic acid anhydride, hexahydrophthalic acid anhydride, tetrachlorophthalic acid anhydride, endomethylenetetrahydrophthalic acid anhydride, glutaric acid anhydride, maleic acid, maleic acid anhydride, fumaric acid, dimer fatty acid, trimer fatty acid, phthalic acid, phthalic acid anhydride, isophthalic acid, terephthalic acid, citric acid or trimellitic acid, with low-molecular polyols, such as, for example, ethylene glycol, diethylene glycol, neopentyl glycol, hexanediol, butanediol, propylene glycol, glycerin, trimethylolpropane, 1,4-hydroxymethylcyclohexane, 2-methyl-1,3-propanediol, butanetriol-1,2,4, triethylene glycol, tetraethylene glycol, polyethylene glycol, dipropylene glycol, polypropylene glycol, dibutylene glycol and polybutylene glycol, or by ring-opening polymerisation of cyclic carboxylic acid esters such as ε-caprolactone. Furthermore, hydroxycarboxylic-acid derivatives, such as, for example, lactic acid, cinnamic acid or ω-hydroxycaproic acid, can also be polycondensed to yield polyester polyols. But polyester polyols of oleochemical origin may also be used. Polyester polyols of such a type may, for example, be prepared by complete ring opening of epoxidised triglycerides of an at least partially olefinically unsaturated fatty-acid-containing fat mixture with one or more alcohols with 1 to 12 C atoms and by subsequent partial transesterification of the triglyceride derivatives to yield alkyl ester polyols with 1 to 12 C atoms in the alkyl residue.

The preparation of suitable polyacrylate polyols is known as such to a person skilled in the art. They are obtained by radical polymerisation of olefinically unsaturated monomers exhibiting hydroxyl groups or by radical copolymerisation of olefinically unsaturated monomers exhibiting hydroxyl groups with, optionally, other olefinically unsaturated monomers such as, for example, ethyl acrylate, butyl acrylate, 2-ethylhexyl acrylate, isobornyl acrylate, methyl methacrylate, ethyl ethacrylate, butyl methacrylate, cyclohexyl methacrylate, isobornyl methacrylate, styrene, acrylic acid, acrylonitrile and/or methacrylonitrile. Suitable olefinically unsaturated monomers exhibiting hydroxyl groups are, in particular, 2-hydroxyethyl acrylate, 2-hydroxyethyl methacrylate, the hydroxypropyl-acrylate isomer mixture that is obtainable by addition of propylene oxide onto acrylic acid and also the hydroxypropyl-methacrylate isomer mixture that is obtainable by addition of propylene oxide onto methacrylic acid. Suitable radical initiators are those from the group of the azo compounds, such as, for example, azoisobutyronitrile (AIBN), or from the group of the peroxides, such as, for example, di-tert.-butyl peroxide.

Component (b) may be present in a suitable solvent. Suitable solvents are those which exhibit a sufficient solubility of the component. Examples of such solvents are acetone, methyl ethyl ketone, cyclohexanone, methyl isobutyl ketone, methyl isoamyl ketone, diisobutyl ketone, ethyl acetate, n-butyl acetate, ethylene glycol diacetate, butyrolactone, diethyl carbonate, propylene carbonate, ethylene carbonate, N,N-dimethyl formamide, N,N-dimethyl acetamide, N-methyl pyrrolidone, N-ethyl pyrrolidone, methylal, ethylal, butylal, 1,3-dioxolane, glycerol formal, benzene, toluene, n-hexane, cyclohexane, solvent naphtha, 2-methoxypropyl acetate (MPA). Furthermore, the solvents may also carry groups that are reactive towards isocyanates. Examples of such reactive solvents are those which exhibit an average functionality of groups that are reactive towards isocyanates of at least 1.8. These may be, for example, low-molecular diols (for example 1,2-ethanediol, 1,3- and 1,2-propanediol, 1,4-butanediol), triols (for example, glycerin, trimethylolpropane), but also low-molecular diamines such as, for example, polyaspartic acid esters.

The polyether amines capable of being employed as component (b) are, in particular, diamines or triamines. Compounds of such a type are, for example, marketed by Huntsman under the name Jeffamine® and by BASF as polyether amines.

By way of crosslinker component or chain-extender, short-chain polyols or polyamines usually find application. Typical chain-extenders are diethyltoluene diamine (DETDA), 4,4'-methylene-bis(2,6-diethyl)aniline (MDEA), 4,4'-methylene-bis(2,6-diisopropyl)aniline (MDIPA), 4,4'-methylene-bis(3-chloro-2,6-diethyl)aniline (MCDEA), dimethylthiotoluene diamine (DMTDA, Ethacure® 300), N,N'-di(sec-butyl)aminobiphenylmethane (DBMDA, Unilink 4200) or N,N'-di-sec-butyl-p-phenylenediamine (Unilink® 4100), 3,3'-dichloro-4,4'-diaminodiphenylmethane (MBOCA), trimethyleneglycol-di-p-aminobenzoate (Polacure 740M). Aliphatic aminic chain-extenders may likewise be employed or used concomitantly. 1,3-propanediol, 1,4-butanediol, 2,3-butanediol, 1,5-pentanediol, 1,6-hexanediol and HQEE (hydroquinone-di(β-hydroxyethyl)ether) may likewise be employed.

The process for preparing the polyisocyanate polyaddition products can be carried out in the presence of conventional flow-improving agents, stabilisers, UV-screening agents, catalysts, anti-hydrolysis agents, emulsifiers, fillers, optionally incorporable dyestuffs (which are accordingly provided with Tserevitinov-active hydrogen atoms) and/or coloured pigments. Also preferred is an addition of zeolites.

Preferred auxiliary agents and additives are blowing agents, fillers, chalk, carbon black or zeolites, flameproofing agents, colouring pastes, water, antimicrobial agents, fluidity-improvers, thixotroping agents, surface-modification agents and retarders in connection with the preparation of the polyisocyanate polyaddition products. Further auxiliary substances and additives include defoamers, emulsifiers, foam stabilisers and cell regulators. A survey is contained in G. Oertel, *Polyurethane Handbook*, 2$^{nd}$ Edition, Carl Hanser Verlag, Munich, 1994, Chapter 3.4.

Typical foaming agents are fluorohydrocarbons, pentane, cyclopentane, water and/or carbon dioxide.

The latent catalysts may be employed for the purpose of producing flexible and rigid foams, coatings, adhesives and sealants, semi-rigid foams, integral foams, spray elastomers and casting elastomers, resins and binding agents in polyurethane chemistry, and also thermoplastic polyurethanes.

Furthermore, the catalysts according to the invention may be employed for the purpose of preparing silicones and polyesters.

The invention will be elucidated in more detail on the basis of the following Examples.

EXAMPLES

Example 1

Preparation of a Latent Catalyst 1

From a solution of Sn(OCH$_2$CH$_2$)$_2$NMe (for preparation, see A. Zschunke, C. Mügge, M. Scheer, K. Jurkschat, A. Tzschach, *J. Crystallogr. Spectrosc. Res.* 1983, 13, 201) in toluene (0.18 mol/l) the solvent was evaporated off at 25° C. in contact with the atmosphere over 48 h. Firstly a colourless solid precipitated out. In the course of further evaporation a yellow oil was obtained. 100 ml toluene were added, and then evaporation was again effected. A further 100 ml toluene were added, and again total evaporation was effected. The oil obtained in this way was dissolved in dichloromethane. After addition of toluene a colourless solid with a melting-point>250° C. precipitated out.

$^{119}$Sn-NMR (CH$_2$Cl$_2$/D$_2$O capillary, 23° C., Me$_4$Sn standard): δ −450 ppm Elemental analysis [wt. %] found: C, 22.6; H, 4.7; N, 5.2; Sn, 45.

In the case of compound 1, it is a question of HO[Sn(OCH$_2$CH$_2$)$_2$NMeO]$_n$H (with n=1 to 2).

Example 2

Preparation of a Latent Catalyst 2

A solution of 2.35 g Sn(OCH$_2$CH$_2$)$_2$NMe in 100 ml dichloromethane was converted at room temperature with 2.42 g dibenzoyl peroxide (dissolved in 50 ml CH$_2$Cl$_2$). Stirring was effected for three hours, and subsequently the solvent was removed in a vacuum. Recrystallisation out of CHCl$_3$ provided 4.16 g of compound 2.

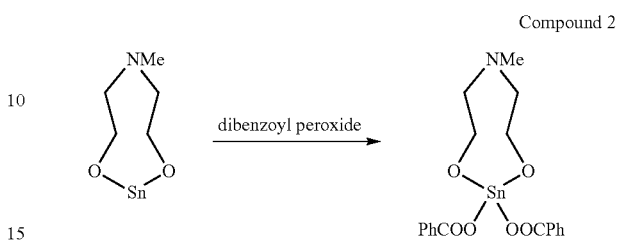

Compound 2

$^{119}$Sn-NMR (CDCl$_3$, 28° C., Me$_4$Sn standard): δ −656 ppm

Elemental analysis [wt. %] (calc.) found: C, (47.73) 46.1; H, (4.43) 4.5; N, (2.93) 2.8.

Definition of pouring-time (pot life) and demoulding-time in the preparation of polyurethane (PUR):

The pouring-time is the time after which the PUR reaction mixture changes its flow behaviour significantly when being poured onto a flat steel plate by reason of a marked rise in viscosity.

The demoulding-time is the time after which the PUR test sample can be pressed out of the steel cylinder manually without deforming.

Example 3

PUR Preparation with Catalyst 1

400 g Desmodur® MS 192 (MDI prepolymer produced by Bayer MaterialScience AG, 19.2% NCO content) were mixed with 340 g Baytec® VP.PU 20GE12 (polyol produced by Bayer MaterialScience AG, OH value: 64 mg KOH/g), 60 g 1,4-butanediol and 0.38 g (0.047 wt. %) of catalyst 1 at 50° C. in a 1.5 l tin-plate can (diameter: 120 mm, height: 135 mm). The mixture was poured into a hollow steel cylinder (diameter: 40 mm, height: 80 mm) which was temperature-controlled at 60° C. and provided with release agent (Indrosil 2000). The test sample was taken out.

Example 4

PUR Preparation with Catalyst 2

400 g Desmodur MS 192 (MDI prepolymer produced by Bayer MaterialScience AG, 19.2% NCO content) were mixed with 340 g Baytec® VP.PU 20GE12 (polyol produced by Bayer MaterialScience AG, OH value: 64 mg KOH/g), 60 g 1,4-butanediol and 0.32 g (0.04 wt. %) of catalyst 2 at 50° C. in a 1.5 l tin-plate can (diameter: 120 mm, height: 135 mm). The mixture was poured into a hollow steel cylinder (diameter: 40 mm, height: 80 mm) which was temperature-controlled at 60° C. and provided with release agent (Indrosil 2000). The test sample was taken out.

Reference Example 5

With Thorcat 535 (80% phenyl neodecanoate, 20% neodecanoic acid; Thor Especialidades S.A.) as Catalyst 400 g Desmodur® MS 192 (MDI prepolymer produced by Bayer MaterialScience AG, 19.2% NCO) were mixed with 340 g Baytec® VP.PU 20GE12 (polyol produced by Bayer MaterialScience AG, OH value: 64 mg KOH/g), 60 g 1,4-butanediol and 0.56 g (0.07 wt. %) Thorcat 535 at 50° C. in a 1.5 l tin-plate can (diameter: 120 mm, height: 135 mm). The mixture was poured into a hollow steel cylinder (diameter: 40 mm, height: 80 mm) which was temperature-controlled at 60° C. and provided with release agent (Indrosil 2000).

Reference Example 6

With 1,4-diazabicyclo[2.2.2]octane (DABCO) as Catalyst 400 g Desmodur MS 192 (MDI prepolymer produced by Bayer MaterialScience AG, 19.2% NCO) were mixed with 340 g Baytec VP.PU 20GE12 (polyol produced by Bayer MaterialScience AG, OH value: 64 mg KOH/g), 60 g 1,4-butanediol and 0.20 g (0.025 wt. %) DABCO at 50° C. in a 1.5 l tin-plate can (diameter: 120 mm, height: 135 mm). The mixture was poured into a hollow steel cylinder (diameter: 40 mm, height: 80 mm) which was temperature-controlled at 60° C. and provided with release agent (Indrosil 2000).

Reference Example 7

With $Sn(OCH_2CH_2)_2NMe$ as Catalyst 400 g Desmodur MS 192 (MDI prepolymer produced by Bayer MaterialScience AG, 19.2% NCO content) were mixed with 340 g Baytec® VP.PU 20GE12 (polyol produced by Bayer MaterialScience AG, OH value: 64 mg KOH/g), 60 g 1,4-butanediol and 0.016 g (0.002 wt. %) $Sn(OCH_2CH_2)_2NMe$ at 50° C. in a 1.5 l tin-plate can (diameter: 120 mm, height: 135 mm). The mixture was poured into a hollow steel cylinder (diameter: 40 mm, height: 80 mm) which was temperature-controlled at 60° C. and provided with release agent (Indrosil 2000).

Reference Example 8

With DBTL (dibutyltin dilaurate) as Catalyst 400 g Desmodur MS 192 (MDI prepolymer produced by Bayer MaterialScience AG, 19.2% NCO) were mixed with 340 g Baytec® VP.PU 20GE12 (polyol produced by Bayer MaterialScience AG, OH value: 64 mg KOH/g), 60 g 1,4-butanediol and 0.02 g (0.0025 wt. %) DBTL at 50° C. in a 1.5 l tin-plate can (diameter: 120 mm, height: 135 mm). The mixture was poured into a hollow steel cylinder (diameter: 40 mm, height: 80 mm) which was temperature-controlled at 60° C. and provided with release agent (Indrosil 2000).

Reference Example 9

With DBTL and N-methyldiethanolamine (1:1) as Catalyst 400 g Desmodur MS 192 (MDI prepolymer produced by Bayer MaterialScience AG, 19.2% NCO) were mixed with 340 g Baytec® VP.PU 20GE12 (polyol produced by Bayer MaterialScience AG, OH value: 64 mg KOH/g), 60 g 1,4-butanediol and 0.032 g (0.004 wt. %) DBTL and N-methyldiethanolamine (1:1) at 50° C. in a 1.5 l tin-plate can (diameter: 120 mm, height: 135 mm). The mixture was poured into a hollow steel cylinder (diameter: 40 mm, height: 80 mm) which was temperature-controlled at 60° C. and provided with release agent (Indrosil 2000).

Reference Example 10

With DABCO DC-2 (Air Products Chemicals Europe B.V.) as Catalyst 400 g Desmodur MS 192 (MDI prepolymer produced by Bayer MaterialScience AG, 19.2% NCO) were mixed with 340 g Baytec® VP.PU 20GE12 (polyol produced by Bayer MaterialScience AG, OH value: 64 mg KOH/g), 60 g 1,4-butanediol and 0.016 g (0.002 wt. %) DABCO DC-2 at 50° C. in a 1.5 l tin-plate can (diameter: 120 mm, height: 135 mm). The mixture was poured into a hollow steel cylinder (diameter: 40 mm, height: 80 mm) which was temperature-controlled at 60° C. and provided with release agent (Indrosil 2000).

TABLE 1

|  | Catalyst [wt. %] | Pouring-time [s] | Demoulding [min] | Hardness Shore A |
|---|---|---|---|---|
| Example 3 | 0.047 | 190 | 11 | 91 |
| Example 4 | 0.04 | 200 | 9 | 91 |
| Reference 5 | 0.07 | 190 | 24 | 92 |
| Reference 6 | 0.004 | 200 | 23 | 92 |
| Reference 7 | 0.002 | 180 | 18 | 92 |
| Reference 8 | 0.0025 | 190 | 22 | 92 |
| Reference 9 | 0.004 | 185 | 21 | 93 |
| Reference 10 | 0.002 | 190 | 23 | 93 |

The hardness was measured after 72 h at room temperature in accordance with DIN 53505.

From the data it can be gathered that in the Examples according to the invention in the case of very long pouring-times the shortest demoulding-times are obtained.

In Reference 5 a customary and conventional mercury catalyst was employed, in Reference 6 a typical catalyst based on a tertiary amine was employed, in Reference 7 a tin(II) catalyst was employed, in Reference 8 a typical tin(IV) catalyst was employed, in Reference 9 a combination of the catalyst from Reference 8 with an amine was employed, and in Reference 10 a tin(IV) catalyst with DABCO ligands was employed.

Reference Example 11 (without catalyst)

38.1 g Desmodur® N3390BA (HDI polyisocyanate produced by Bayer MaterialScience AG, 19.6% NCO content) were mixed with 100 g Desmophen® A870BA (polyol produced by Bayer MaterialScience AG, 2.95% OH content). Directly after mixing, after 60 min, after 120 min and after 240 min, the viscosity was determined as efflux-time (DIN 53 211, 4 mm DIN flow cup at 23° C.). The drying-times T1, T2, T3 and T4 according to DIN 53 150 in the case of a storage at room temperature and in the case of a storage at 60° C. and also the pendulum hardness values [pendulum damping according to König (DIN EN ISO 1522)] after 7 d were determined.

Reference Example 12

With dibutyltin dilaurate as Catalyst 38.1 g Desmodur® N3390BA (HDI polyisocyanate produced by Bayer MaterialScience AG, 19.6% NCO content) were mixed with 100 g Desmophen® A870BA (polyol produced by Bayer MaterialScience AG, 2.95% OH content) and 3.2 g dibutyltin dilaurate (1 wt. % in butyl acetate). Directly after mixing, after 60 min, after 120 min and after 240 min, the viscosity was determined as efflux-time (DIN 53 211, 4 mm DIN flow cup at 23° C.). The drying-times T1, T2, T3 and T4 according to DIN 53 150 in the case of a storage at room temperature and in the case of a storage at 60° C. and also the pendulum hardness values [pendulum damping according to König (DIN EN ISO 1522)] after 7 d were determined.

Example 13

With Catalyst 1

38.1 g Desmodur® N3390BA (HDI polyisocyanate produced by Bayer MaterialScience AG, 19.6% NCO content) were mixed with 100 g Desmophen A870BA (polyol produced by Bayer MaterialScience AG, 2.95% OH) and 2.9 g catalyst 1 (10 wt. % in dichloromethane). Directly after mixing, after 60 min, after 120 min and after 240 min, the viscosity was determined as efflux-time (DIN 53 211, 4 mm DIN flow cup at 23° C.). The drying-times T1, T2, T3 and T4 according to DIN 53 150 in the case of a storage at room temperature and in the case of a storage at 60° C. and also the pendulum hardness values [pendulum damping according to König (DIN EN ISO 1522)] after 7 d were determined.

TABLE 2

| | Reference 11 | Reference 12 | Example 13 |
|---|---|---|---|
| Efflux-times at RT [s] | | | |
| 0 h | 19 | 19 | 18 |
| 1 h | 20 | 26 | 20 |
| 2 h | 21 | 38 | 23 |
| 4 h | 22 | 57 | 25 |
| Drying-times at RT [h] | | | |
| T1 | 2 | 2 | 2 |
| T2 | 7 | 5 | 7 |
| T3 | 7 | 7 | 7 |
| T4 | 7 | 7 | 7 |
| Drying-times at 60° C. [h] | | | |
| T1 | 0 | 0 | 0 |
| T2 | 4 | 0 | 1 |
| T3 | 5 | 0 | 3 |
| T4 | 6 | 1 | 4 |
| Pendulum hardness values (storage at 60° C.) [s] | | | |
| 7 d | 198 | 177 | 186 |

From the efflux-times it can be gathered that in Example 13 catalyst 1 displays only an extremely low catalytic activity at room temperature in comparison with DBTL. From the drying-times it can be gathered that at room temperature catalyst 1 displays no marked catalytic activity in comparison with DBTL; at 60° C., on the other hand, it displays a significant catalytic activity.

Example 14

Preparation of a Latent Catalyst 3

5.20 g 5-tert.-butyl-(5-aza-2,8-dioxa-1-stanno)cyclooctane were dissolved in 200 ml benzene. To the solution there were dispensed in drops 25 ml of a solution of chlorine in tetrachloromethane (6.3 g/100 ml). A solid precipitated out of the solution. After removal of the solvent in a vacuum, 5-tert.-butyl-(5-aza-2,8-dioxa-1-stanno-1,1-dichloro)cyclooctane (compound 3, $Cl_2Sn(OCH_2CH_2)_2N$-tBu) was obtained in quantitative yield as a colourless solid.

$^1$H-NMR (300.13 MHz, $C_6D_6$): δ=1.13 (s, 9H, $(CH_3)_3$—C—N), 2.06 (dd, 2H, N—$CH_2$), 2.92 (s, 2H, N—$CH_2$), 4.09 (t, 2H, $CH_2$—O), 4.40 ppm (s, 2H, $CH_2$—O).

$^{13}$C{$^1$H}-NMR (75.47 MHz, $C_6D_6$): δ=27.1 (s, $(CH_3)_3$—C—N), 53.6 (s, N—$CH_2$), 57.1 (s, N—$CH_2$), 62.2 ppm (s, 2× $CH_2$—O).

Example 15

Preparation of a Latent Catalyst 4

Compound 4 ($Cl_2Sn(OCH_2CH_2)_2N$-Me) was prepared from 5-methyl(5-aza-2,8-dioxa-1-stanno)cyclooctane in a manner analogous to the synthesis instructions for catalyst 3 (Example 14).

Example 16

PUR Preparation with the Catalyst $(iPrO)_2Sn(OCH_2CH_2)_2NMe$, Prepared by Conversion of $(iPrO)_4Sn$ with N-methyl diethanolamine 280 g Desmodur MS 192 (MDI prepolymer produced by Bayer MaterialScience AG, 19.2% NCO content) were mixed with 470 g Baytec® VP.PU 20GE12 (polyol produced by Bayer MaterialScience AG, OH value: 64 mg KOH/g), 30 g 1,4-butanediol and 1.40 g (0.179 wt. %) catalyst at 50° C. in a 1.5 l tin-plate can (diameter: 120 mm, height: 135 mm). The mixture was poured into a hollow steel cylinder (diameter: 40 mm, height: 80 mm) which was temperature-controlled at 80° C. and provided with release agent (Indrosil 2000). The test sample was taken out.

Example 17

PUR Preparation with Catalyst 3

280 g Desmodur® MS 192 (MDI prepolymer produced by Bayer MaterialScience AG, 19.2% NCO content) were mixed with 470 g Baytec® VP.PU 20GE12 (polyol produced by Bayer MaterialScience AG, OH value: 64 mg KOH/g), 30 g 1,4-butanediol and 0.75 g (0.096 wt. %) of catalyst 3 at 50° C. in a 1.5 l tin-plate can (diameter: 120 mm, height: 135 mm). The mixture was poured into a hollow steel cylinder (diameter: 40 mm, height: 80 mm) which was temperature-controlled at 80° C. and provided with release agent (Indrosil 2000). The test sample was taken out.

Example 18

PUR Preparation with Catalyst 4

280 g Desmodur MS 192 (MDI prepolymer produced by Bayer MaterialScience AG, 19.2% NCO content) were mixed with 470 g Baytec® VP.PU 20GE12 (polyol produced by Bayer MaterialScience AG, OH value: 64 mg KOH/g), 30 g 1,4-butanediol and 1.0 g (0.128 wt. %) of catalyst 4 at 50° C. in a 1.5 l tin-plate can (diameter: 120 mm, height: 135 mm). The mixture was poured into a hollow steel cylinder (diameter: 40 mm, height: 80 mm) which was temperature-con-

Reference Example 19

With Thorcat 535 (80% phenyl neodecanoate, 20% neodecanoic acid; Thor Especialidades S.A.) as Catalyst 280 g Desmodur® MS 192 (MDI prepolymer produced by Bayer MaterialScience AG, 19.2% NCO) were mixed with 470 g Baytec® VP.PU 20GE12 (polyol produced by Bayer MaterialScience AG, OH value: 64 mg KOH/g), 30 g 1,4-butanediol and 0.3 g (0.038 wt. %) Thorcat 535 at 50° C. in a 1.5 l tin-plate can (diameter: 120 mm, height: 135 mm). The mixture was poured into a hollow steel cylinder (diameter: 40 mm, height: 80 mm) which was temperature-controlled at 80° C. and provided with release agent (Indrosil 2000). The test sample was taken out.

Reference Example 20

With 1,4-diazabicyclo[2.2.2]octane (DABCO) as Catalyst 280 g Desmodur MS 192 (MDI prepolymer produced by Bayer MaterialScience AG, 19.2% NCO) were mixed with 470 g Baytec® VP.PU 20GE12 (polyol produced by Bayer MaterialScience AG, OH value: 64 mg KOH/g), 30 g 1,4-butanediol and 0.024 g (0.003 wt. %) DABCO at 50° C. in a 1.5 l tin-plate can (diameter: 120 mm, height: 135 mm). The mixture was poured into a hollow steel cylinder (diameter: 40 mm, height: 80 mm) which was temperature-controlled at 80° C. and provided with release agent (Indrosil 2000). The test sample was taken out.

Reference Example 21

With $Sn(OCH_2CH_2)_2NMe$ as Catalyst 280 g Desmodur MS 192 (MDI prepolymer produced by Bayer MaterialScience AG, 19.2% NCO content) were mixed with 470 g Baytec® VP.PU 20GE12 (polyol produced by Bayer MaterialScience AG, OH value: 64 mg KOH/g), 30 g 1,4-butanediol and 0.015 g (0.0019 wt. %) $Sn(OCH_2CH_2)_2NMe$ at 50° C. in a 1.5 l tin-plate can (diameter: 120 mm, height: 135 mm). The mixture was poured into a hollow steel cylinder (diameter: 40 mm, height: 80 mm) which was temperature-controlled at 80° C. and provided with release agent (Indrosil 2000). The test sample was taken out.

Reference Example 22

With DBTL (dibutyltin dilaurate) as Catalyst 280 g Desmodur MS 192 (MDI prepolymer produced by Bayer MaterialScience AG, 19.2% NCO) were mixed with 470 g Baytec® VP.PU 20GE12 (polyol produced by Bayer MaterialScience AG, OH value: 64 mg KOH/g), 30 g 1,4-butanediol and 0.03 g (0.0038 wt. %) DBTL at 50° C. in a 1.5 l tin-plate can (diameter: 120 mm, height: 135 mm). The mixture was poured into a hollow steel cylinder (diameter: 40 mm, height: 80 mm) which was temperature-controlled at 80° C. and provided with release agent (Indrosil 2000). The test sample was taken out.

Reference Example 23

With DABCO DC-2 (Air Products Chemicals Europe B.V.) as Catalyst 280 g Desmodur MS 192 (MDI prepolymer produced by Bayer MaterialScience AG, 19.2% NCO) were mixed with 470 g Baytec® VP.PU 20GE12 (polyol produced by Bayer MaterialScience AG, OH value: 64 mg KOH/g), 30 g 1,4-butanediol and 0.015 g (0.0019 wt. %) DABCO DC-2 at 50° C. in a 1.5 l tin-plate can (diameter: 120 mm, height: 135 mm). The mixture was poured into a hollow steel cylinder (diameter: 40 mm, height: 80 mm) which was temperature-controlled at 80° C. and provide with release agent (Indrosil 2000). The test sample was taken out.

TABLE 3

| | Catalyst [wt. %] | Pouring-time [s] | Demoulding [min] | Hardness Shore A |
|---|---|---|---|---|
| Example 16 | 0.179 | 240 | 10 | 71 |
| Example 17 | 0.096 | 240 | 19 | 72 |
| Example 18 | 0.128 | 310 | 17 | 72 |
| Reference 19 | 0.038 | 230 | 18 | 73 |
| Reference 20 | 0.003 | 260 | 90 | 72 |
| Reference 21 | 0.0019 | 230 | 75 | 72 |
| Reference 22 | 0.0038 | 240 | 100 | 73 |
| Reference 23 | 0.0019 | 250 | 100 | 72 |

The hardness was measured after 72 h at room temperature in accordance with DIN 53505.

From the data it can be gathered that, with roughly equal pouring-times in the Examples according to the invention, demoulding-times are obtained that lie within the range of the best commercial catalyst (mercury catalyst) or below. In Example 18, with distinctly longer pouring-time in comparison with the mercury catalyst (Reference 19, practically the same demoulding-time is obtained.

In Reference 19 a customary and conventional mercury catalyst was employed, in Reference 20 a typical catalyst based on a tertiary amine was employed, in Reference 21 a tin(II) catalyst was employed, in Reference 22 a typical tin (IV) catalyst was employed, and in Reference 23 a tin(IV) catalyst with DABCO ligands was employed.

The invention claimed is:

1. A latent catalyst consisting of a tetravalent mononuclear tin compound of the formula I with at least one ligand bonded via at least one oxygen atom or sulfur atom and comprising at least one nitrogen atom, $$Sn(IV)(L^1)_{n1}(L^2)_{n2}(L^3)_{n3}(L^4)_{n4} \qquad (I)$$

wherein n1, n2, n3, and n4 are, independently of one another, an integer from 0 to 1 and $L^1, L^2, L^3$, and $L^4$ are, independently of one another, univalent, divalent, trivalent or tetravalent ligands wherein at least one ligand per Sn atom has the following significance:

—X—Y wherein
X=O, S, OC(O), OC(S), O(O)S(O)O, O(O)S(O)
Y=—R1-N(R2)(R3) or —R1-C(R4)=NR2 wherein R1, R2, R3, and R4 are, independently of one another, saturated or unsaturated, cyclic or acyclic, branched or unbranched, substituted or unsubstituted hydrocarbon residues optionally interrupted by heteroatoms, or R2, R3, and R4 are, independently of one another, hydrogen, R1-X, or R2 and R3 or R2 and R1 or R3 and R1 or R4 and R1 or R4 and R2 form a ring; and wherein the remaining ligands are, independently of one another, —X—Y with the aforementioned significance or have the following significance:

halides, hydroxide, saturated or unsaturated, cyclic or acyclic, branched or unbranched, substituted or unsubstituted hydrocarbon residues bonded to the tin atom by way of at least one oxygen or sulfur.

2. A process for preparing a polyisocyanate polyaddition product which comprises reacting a polyisocyanate and a NCO-reactive compound with the latent catalyst according to claim 1.

3. A polyisocyanate polyaddition product, obtained from reacting a) a polyisocyanate; and b) a NCO-reactive compound in the presence of c) a latent catalyst;

d) optionally, a further catalyst and/or activator different from c)

with addition of e) optionally, a blowing agent;

f) optionally, a filler and/or fibrous material;

g) optionally, an auxiliary agent and/or additive;

wherein the latent catalyst comprises a tetravalent mononuclear tin compound of the formula I with at least one ligand bonded via at least one oxygen atom or sulfur atom and comprising at least one nitrogen atom $$\text{Sn(IV)}(L^1)_{n1}(L^2)_{n2}(L^3)_{n3}(L^4)_{n4} \qquad (I)$$

wherein n1, n2, n3, and n4 are, independently of one another, an integer from 0 to 1 and $L^1$, $L^2$, $L^3$, and $L^4$ are, independently of one another, univalent, divalent, trivalent or tetravalent ligands or tetravalent polynuclear tin compounds based thereon, wherein at least one ligand per Sn atom has the following significance:

—X—Y wherein

X=O, S, OC(O), OC(S), O(O)S(O)O, O(O)S(O)

Y=—R1-N(R2)(R3) or —R1-C(R4)=NR2 wherein, R1, R2, R3, and R4 are, independently of one another, saturated or unsaturated, cyclic or acyclic, branched or unbranched, substituted or unsubstituted hydrocarbon residues optionally interrupted by heteroatoms, or R2, R3, and R4 are, independently of one another, hydrogen, R1-X, or R2 and R3 or R2 and R1 or R3 and R1 or R4 and R1 or R4 and R2 form a ring; and wherein the remaining ligands are, independently of one another, —X—Y with the aforementioned significance or have the following significance:

halides, hydroxide, saturated or unsaturated, cyclic or acyclic, branched or unbranched, substituted or unsubstituted hydrocarbon residues bonded to the tin atom by way of at least one oxygen or sulfur.

4. The polyisocyanate polyaddition product according to claim 3, wherein the latent catalyst comprises a tin compound selected from the group consisting of Formulae (a) and (d) to (j):

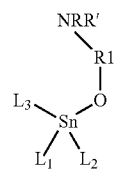
(a)

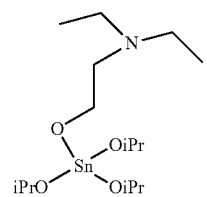
(d)

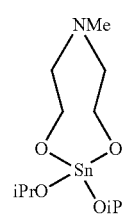
(e)

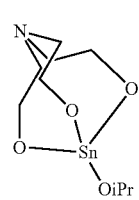
(f)

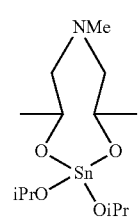
(g)

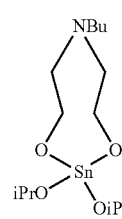
(h)

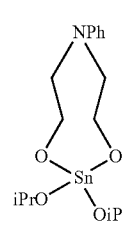
(i)

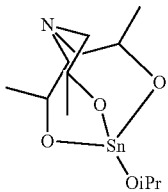
(j)

wherein iPr is isopropyl-, Me is methyl-, Bu is n-butyl-, Ph is phenyl-, and R and R' are, identically or differently, alkyl groups.

5. The polyisocyanate polyaddition product according to claim 3, wherein the latent catalyst comprises a tin compound selected from the group consisting of Formulae (d) to (j):

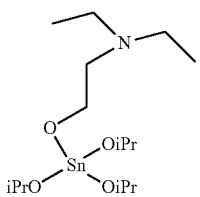
(d)

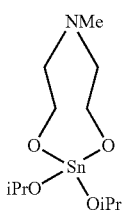
(e)

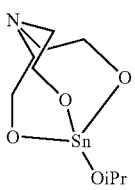
(f)

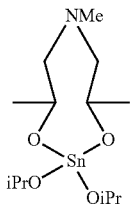
(g)

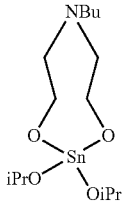
(h)

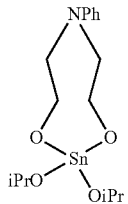
(i)

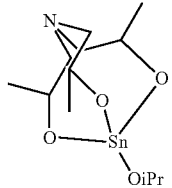
(j)

wherein iPr is isopropyl-, Me is methyl-, Bu is n-butyl-, and Ph is phenyl-.

6. A process for preparing the polyisocyanate polyaddition product according to claim 3, wherein the polyisocyanate (a) is converted with the NCO-reactive compound (b) in the presence of the latent catalyst (c) and, optionally, adding the catalyst and/or activator different from (c) with addition of, optionally, the blowing agent, optionally the filler and/or the fibrous material and, optionally, auxiliary substances and/or additives, wherein the latent catalyst comprises tetravalent mononuclear tin compounds of the formula I with at least one ligand bonded via at least one oxygen atom or sulfur atom and comprising at least one nitrogen atom $$Sn(IV)(L^1)_{n1}(L^2)_{n2}(L^3)_{n3}(L^4)_{n4} \quad (I)$$

wherein n1, n2, n3, and n4 are, independently of one another, an integer from 0 to 1 and wherein $L^1$, $L^2$, $L^3$, and $L^4$ are, independently of one another, univalent, divalent, trivalent or tetravalent ligands or tetravalent polynuclear tin compounds based thereon, wherein at least one ligand per Sn atom has the following significance:

—X—Y wherein
X=O, S, OC(O), OC(S), O(O)S(O)O, O(O)S(O)
Y=—R1-N(R2)(R3) or —R1-C(R4)=NR2
wherein R1, R2, R3, and R4 are, independently of one another, saturated or unsaturated, cyclic or acyclic, branched or unbranched, substituted or unsubstituted hydrocarbon residues optionally interrupted by heteroatoms, or R2, R3, and R4 are, independently of one another, hydrogen, R1-X, or R2 and R3 or R2 and R1 or R3 and R1 or R4 and R1 or R4 and R2 form a ring; and
wherein the remaining ligands independently of one another are —X—Y with the aforementioned significance or have the following significance:
halides, hydroxide, saturated or unsaturated, cyclic or acyclic, branched or unbranched, substituted or unsubstituted hydrocarbon residues bonded to the tin atom by way of at least one oxygen or sulfur.

* * * * *